United States Patent [19]

Rich

[11] 3,790,887

[45] Feb. 5, 1974

[54] AMPLIFYING AND HOLDING MEASUREMENT CIRCUIT

[75] Inventor: Theodore A. Rich, Schenectady, N.Y.

[73] Assignee: Environment/One Corporation, Schenectady, N.Y.

[22] Filed: Dec. 3, 1971

[21] Appl. No.: 204,471

Related U.S. Application Data

[62] Division of Ser. No. 840,775, July 10, 1969, Pat. No. 3,664,740.

[52] U.S. Cl. .............. 324/111, 324/103 P, 324/115
[51] Int. Cl. ...................... G01r 15/08, G01r 19/16
[58] Field of Search... 324/111, 115, 132, 103 P, 324/103 R

[56] References Cited
UNITED STATES PATENTS

| | | | |
|---|---|---|---|
| 3,413,491 | 11/1968 | Reeves et al. | 324/103 R |
| 3,458,812 | 7/1969 | Krussmann et al. | 324/103 R |
| 2,982,914 | 5/1961 | Stewart | 324/111 |
| 3,197,780 | 7/1965 | Gilchrist | 324/111 |

Primary Examiner—Rudolph V. Rolinec
Assistant Examiner—Ernest F. Karlsen
Attorney, Agent, or Firm—Charles W. Helzer

[57] ABSTRACT

A measure and hold amplifying circuit comprised by a sampling capacitor and a holding capacitor and first and second switches for transferring an amplified output signal to be measured from the output of a preamplifier to the sampling capacitor and thereafter to the holding capacitor with the holding capacitor being connectible across the input of a field effect transistor operational amplifier whose output supplies a suitable indicating meter. The holding and measuring amplifying circuit further includes a discharge resistor that intermittently is connected in circuit relationship across the sampling capacitor for sequentially discharging it intermediate each sampling operation, and a properly poled coupling diode which is connected between the output of the preamplifier and the first switching device whereby the blocking diode blocks reverse current flow from the sampling capacitor back into the output of the preamplifier and prevents the sampling capacitor and discharging resistor from unduly loading the output of the preamplifier.

1 Claim, 2 Drawing Figures

PATENTED FEB 5 1974 3,790,887

INVENTOR
THEODORE A. RICH

Charles W Helzer
ATTORNEY

AMPLIFYING AND HOLDING MEASUREMENT CIRCUIT

This invention relates to an improved amplifying and holding measurement circuit and is a Divisional Application of U.S. application Ser. No. 840,775, filed July 10, 1969, now U.S. Pat. No. 3,664,740 for "Self Adjusting Short Pulse Detecting and Amplifying Circuit" - T. A. Rich, Inventor.

BACKGROUND OF INVENTION

1. Field of Invention

More particularly, the invention relates to an amplifying and holding measurement circuit for measuring instruments such as condensation nuclei meters.

2. Statement of Prior Art

Maintaining a measuring instrument output reading over relatively long measurement periods where the phenomenon being measured is transient in nature, has been in the past and presently is a continuing problem for measurement engineers. There are numerous examples of prior art complex and costly measurement circuits for maintaining measuring accuracy over prolonged periods. However, most of these prior art measuring schemes add so much complexity and cost to the measuring system in which they are included that their use is prohibited in many measuring circuit applications. To meet the need for a good, low cost, amplifying and holding measurement circuit for use with a wide variety of measuring instruments, the present circuit was devised.

SUMMARY OF INVENTION

It is therefore a primary object of the present invention to provide a new and improved amplifying and holding measurement circuit for use with a wide variety of measuring instruments.

In practicing the invention, an output indicating means such as a meter is coupled to the output circuit of a field effect transistor operational amplifier that is responsive substantially only to the short term changes in operating condition of a detecting instrument such as a condensation nuclei meter that is connected to the input of the operational amplifier. The input to the amplifier is connected through a suitable switching circuit to a holding capacitor. The switching circuit alternately connects the holding capacitor first to the output of a preamplifier and then to the input of the operational amplifier for providing a substantially continuous output indication of transient changes in the physical phenomenon (such as transient changes in light level due to the production of a cloud in the expansion chamber of a condensation nuclei meter) being measured by the meter.

BRIEF DESCRIPTION OF DRAWINGS

Other objects, features and many of the attendant advantages of this invention will be appreciated more readily when the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

Figure 1:
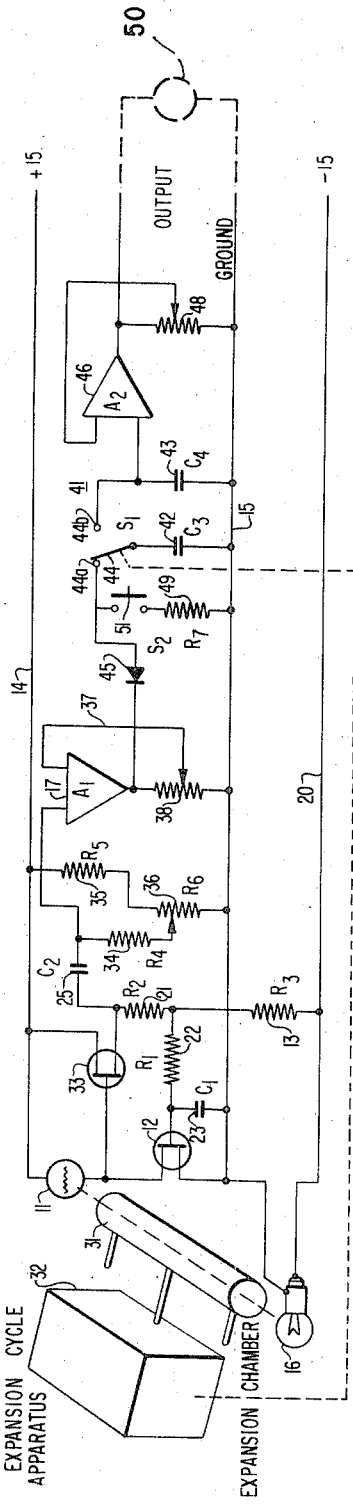
FIG. 1 is a detailed schematic circuit diagram of a first preferred form of the invention illustrating the connection of the circuit to a condensation nuclei meter for use in deriving an improved output signal from the condensation nuclei meter.

The circuit of FIG. 1 includes a field effect transistor 12 having its source and drain electrodes connected in series circuit relationship with a photo conductor 11 for maintaining long term constant voltage across the photo conductor. The juncture of the photo conductor 11 with the drain electrode of the field effect transistor 12 is connectdd to the gate electrode of a second field effect transistor 33 having its drain and source electrodes connected in series circuit relationship with a pair of series connected load resistors 13 and 21 across the power supply terminal 14 and 20. The power supply terminal 14 is connected to a plus 15 volt source of electric energy, the power supply terminal 20 is connected to a minus 15 volt source of electric energy and the power supply terminal 15 is connected to a grounded supply terminal. The juncture of the load resistors 13 and 21 is connected back through a long time constant resistor-capacitor feedback network 22 and 23 to the control gate of the field effect transistor 12 for long term gain stabilization purposes.

With the circuit shown in FIG. 1, the voltage across the photo conductor 11 is kept substantially constant at a nominal value of plus 10 volts. If this voltage tends to increase due to a reduction in light level because of dirty optics, change in supply voltage to the lamp 16, etc. the voltage at the juncture of the load resistors 13 and 21 tends to decrease. After a time delay determined by the RC time constant of resistor 22 and capacitor 23 the gate voltage of the field effect transistor 12 (hereinafter referred to as an FET) decreases and brings the voltage across the photo conductor 11 back towards its initial value. In one test setup of the circuit shown in FIG. 1, a slow change of 2 to 1 in the resistance of the photo conductor 11 resulted only in a change in voltage across the cell of approximately 1 percent where the photo conductor resistance changed over a range of 440 kiloms to 1 megohm.

For a rapid or short term transient change in the instantaneous value of the photo conductor 11 (such as would be caused by the formation of a cloud of water droplets in the expansion chamber 31 of the condensation nuclei meter during a sampling or measuring interval of the meter), the transient output signal pulse appearing across the load resistors 13 and 21 is completed before there is time for the feedback path comprised by 22 and 23 to take effect. The resultant instantaneous change (short term) in the voltage across the cell is some 85 percent of the percent change in its resistance value. This again is nearly twice the value that could be obtained with an equal arm measuring bridge and is due to the substantially flat slope of the E/I curve of the FET 12. The provision of the second FET 33 improves the response of the circuit, and in addition, is in the form of a cathode follower so that it provides a low impedance output.

The short term transient signal pulse appearing across output load resistors 31 and 12 is supplied through coupling capacitor 25 which blocks the long term d.c. component of the signal to one input terminal of an operational amplifier 17. Operational amplifier 17 also has a gain adjusting resistor network comprised by fixed resistors 34 and 35 and variable resistor 36 connected to the input terminal supplied through coupling capacitor 25, and has a feedback connection 37 between its output load resistor 38 and a second input terminal to the operational amplifier. The operational amplifier 17 may comprise a conventional, commercially available integrated circuit amplifier sold by a number of integrated circuit manufacturers, and is used to amplify the transient signal pulse voltage produced by the cloud of water droplets in the expansion chamber 31. The capacitor 25 blocks the d.c. component of the signal so that operational amplifier 17 produces at its output a transient signal pulse whose magnitude is representative of the number of condensation nuclei contained in the sample gaseous atmosphere being monitored by the condensation nuclei meter.

In order to provide a continuous output indication or reading of the time average value of the transient output signal pulses appearing across the output load resistor 38 of operational amplifier 17, a holding circuit means is included in the output indicating arrangement of the detecting and amplifying circuit shown in FIG. 1. This holding circuit means is shown generally at 41 and includes a sampling capacitor 42 and a holding capacitor 43. The sampling capacitor 42 has one of its plates connected through the movable contact of a sampling switch 44 to either of the fixed contacts 44a or 44b of the sampling switch. The fixed contact 44a is coupled through a coupling diode 45 to the output load resistor 38 of operational amplifier 17 and the fixed contact 44b is connected to one plate of the holding capacitor 43 and to an input terminal of a FET operational amplifier 46. The remaining plates of sampling capacitor 42 and holding capacitor 43 are connected to the grounded power supply terminal 15. The movable contact of sampling switch 44 is connected through an interconnecting link shown at 47 which may comprise a mechanical interconnection, a pneumatic interconnection, or an electrical interconnection back to the expansion cycle apparatus 32 of the condensation nuclei meter. By this interconnection, the sampling switch 44 can be made to operate synchronously with the formation of the water cloud droplets in the expansion chamber 31 during operation of the condensation nuclei meter.

To complete the output indicating circuit, a FET operational amplifier 46 has its output load resistor 48 connected to drive a suitable indicating meter 50, cathode ray tube, recording chart, or other suitable recording instrument for providing an indication of the instantaneous value of the time average voltage appearing across the holding capacitor 43. Because the operational amplifier 46 employs a FET input stage having an extremely high input resistance, it does not load down the holding capacitor or substantially alter its charge value intermediate sampling intervals of the sampling capacitor 42 as will be described hereinafter.

The holding circuit means also further includes a resistor 49 and a second intermittently operated switch 51 connected to the juncture of the coupling diode 45 with the fixed contact 44a of the first sampling switch 44. With this arrangement, during operating intervals when the movable contacts of switch 44 are closed on 44a and the switch 51 is closed, the charge on sampling capacitor 42 will be discharged through resistor 49 in order to condition it for the next successive transient output signal pulse supplied thereto from operational amplifier 17 through coupling diode 45. During these discharge intervals of operation, the blocking effect of diode 45 prevents the capacitor 42 and the discharge resistor 49 from loading down the output of operational amplifier 17.

During operation of the circuit shown in FIG. 1, the peak value of the transient output signal pulse appearing across the output resistor 38 of operational amplifier 17 is obtained by charging the sampling capacitor 42 to the peak value through coupling rectifier 45 and switch contacts 48. Switch 44 then sequentially is operated to close on contact 44b and transfer the charge built up on sampling capacitor 42 to the holding capacitor 43. If the capacitance value of holding capacitor 43 is equal to the capacitance value of the sampling capacitor 42, then one-half the charge in peak value output would appear on the holding capacitor 43 during each second assuming that the switching rate of switch 44 is 1 per second. If the capacitance C3 of capacitor 42 is substantially greater than the capacitance C4 of holding capacitor 43, there would be a complete response in one second, or if the C3 is smaller than C4 the time constant would be greater than two seconds. In this manner, the response of the instrument to changes in the physical phenomenon being observed can be tailored to the particular measuring application in mind. The output FET operational amplifier 46 can be designed to have an input resistance which is extremely high, for example $10^{11}$ ohms, so that the rate of decay on the holding capacitor 43 between charging or sampling intervals is negligible. The second switch S2 is designed to discharge the sampling capacitor 42 intermediate each sampling operation before it is recharged, so as to enable the the holding circuit to follow immediately a decreasing level in the signal output from operational amplifier 17. The switching sequence is switch 44 closed on switch contact 44a from 0.6 seconds before the peak value to 0.1 second after the peak value. Switch 44 then closes on fixed contact 44b from 0.1 second after the peak value to 0.4 second after the peak value, and switch 51 is closed from about 0.4 seconds to 0.7 seconds after the peak value. This sequence of closure is cited as merely exemplary of one manner of operation of the holding circuit, and should not be considered as comprising the only or a preferred way of operating the circuit.

As a result of operation in the above-described manner, the sampling capacitor 42 will reach essentially the peak voltage value at the time of occurrence of the peak. At 0.1 of a second to 0.4 of a second after the peak value, it is in parallel with the holding capacitor 43 (and takes on the average voltage of $C_3 + C_4$ just before they were put in parallel). At 0.6 of a second before the peak (0.4 seconds after the peak) capacitor 43 is reconnected to 44a and from 0.6 seconds to 0.3 seconds before the peak (0.4 seconds to 0.7 seconds after the peak) it is discharged partially to a lower voltage through switch 51 and resistor 49 prior to the commencement of a new sampling cycle in the above-described manner. The resistors 35 and 36 comprise a voltage divider for 0 (zero) adjustment to the input of operational amplifier 17.

Figure 2:
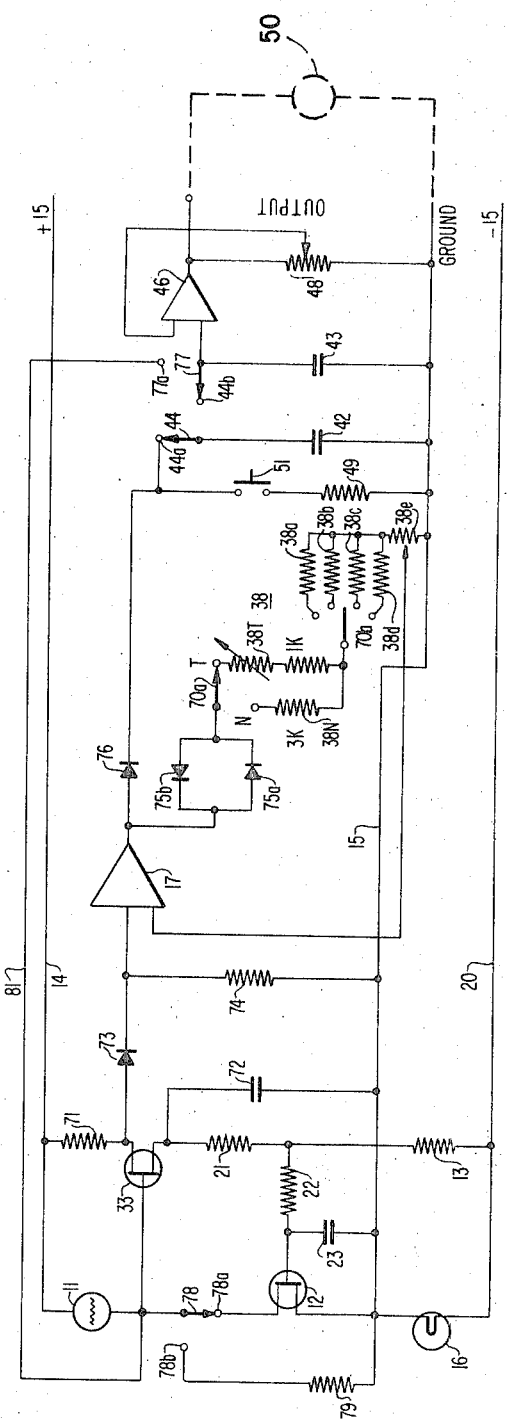
FIG. 2 is a partial schematic circuit diagram of still another alternative form of output circuit for use in the over-all detecting and amplifying circuit of FIG. 2.

FIG. 2 is a detailed schematic circuit diagram of a preferred form of construction of the detecting and amplifying circuit. While FIG. 2 is intended for use with a condensation nuclei meter in the same manner as shown in FIG. 1, the expansion cycle apparatus and expansion chamber have not been shown in FIG. 2 together with the interconnection to the sampling and holding switches for the purpose of simplifying the diagram. The appropriate interconnection of the circuit to provide for use with a condensation nuclei meter are believed to be obvious to one skilled in the art in the light of the teachings of FIG. 1. The circuit shown in FIG. 2 is intended for those measurement applications where it is desired to obtain positive going signal pulses in the output circuit for use with control equipment, data processing equipment, etc. which generally require a positive going input signal for compatibility.

Primarily for the above set forth reason, the second FET 33 has its drain electrode connected to the positive 15 volt power supply terminal 14 through a load resistor 71 and has its source electrode connected through suitable biasing resistors 13 and 21 to the minus 15 volt power supply terminal 20 and through a by-pass capacitor 72 to the ground supply terminal 15. The values of the resistors 13 and 21 are adjusted so as to provide the desired feedback effect for long term voltage changes in order to adjust the conductivity of the FET 12 to maintain constant voltage across the photo conductor 11. The transient output signal pulses do not appear across these resistors however because of by-pass capacitor 72. Instead, the transient output signal pulse appearing across resistor 71 will be positive going in nature and are coupled through coupling diode 73 and a fixed input resistor 74 to the input of operational amplifier 17.

In addition to the above changes, the circuit of FIG. 2 shows a different range or scale changing network for use in changing the range of operation of the measuring circuit. This range or scale changing network 38 is comprised by two parallel connected resistors 38N and 38T, a pair of scale changing switches 70a and 70b and a plurality of scale changing fixed resistors 38a – 38d. The output from operational amplifier 17 is connected to the scale changing resistive network 38 through a pair of reverse polarity, parallel connected diodes 75a and 75b to the first scale changing selector switch 70a. Switch 70a is designed to be selectively closed on either fixed switch contact N or T. With 70a closed on N, fixed resistor 38N is connected in the output of operational amplifier 17 for normal operation. When thus connected, 70b may be connected to any one of the plurality of scale changing resistors 38a – 38d depending upon the measurement scale desired. The reverse polarity, parallel connected diodes 75b and 75a are added into the circuit in order to compensate for the voltage drop across the output coupling diodes 76 for improved measurement accuracy. Feedback to the input of operation amplifier 17 is obtained across commonly connected resistor 38e.

For some types of tests employing condensation nuclei detectors, it is desirable to obtain a percent change in measurement of the nuclei particles being detected. For this purpose, the additional contact T and variable resistor 38T are provided along with the scale changing resistors 38a – 38d. This additional contact is used, for example, when one wishes to employ the condensation nuclei meter for particle size measuring purposes. For such purposes, a diffusion box would be inserted in the measuring system in advance of the condensation nuclei meter following a first reading of the meter without the diffusion box. A diffusion box can be designed to have a predetermined transmission for any given particle size. If the transmission is known an average size of particles is known. Accordingly, while making particle size measurements, with switch 70a closed on T, variable resistor 38T is adjusted to provide a full scale reading of the meter connected to the output of FET operational amplifier 46. Thereafter, the diffusion box is inserted in the measuring system, and a second measurement is taken. This second measurement will provide a direct reading of the percent transmission of particles through the diffusion box. No calculation is needed to read the size directly from a chart or graph and in this manner, the instrument can be adjusted readily to facilitate particle size measurement.

In addition to the above features of positive signal output and facilitating particle size measurements, the circuit of FIG. 2 includes an additional circuit feature which allows an operator of the equipment to check the condition of the photo conductor 11 and/or the optics of the instrument. This additional circuit feature is comprised by a selector switch 77 which normally is closed on the fixed contact 44b of sampling switch 44 but selectively may be closed on a fixed contact 77a that is coupled back through a conductor 81 to the juncture of the photo conductor 11 with the FET 12. This juncture is also connected through a selector switch 78 which normally is closed on its fixed contact 78a that is connected to the drain electrode of FET 12. Selector switch 78 may also be closed on a fixed contact 78b that is connected through a calibrating resistor 79 to the grounded power supply terminal 15. With this arrangement, an operator of the equipment selectively may close the switches 77 and 78 so as to connect in the calibrating resistor 79 to the output of the measuring circuit. When thus connected, the output will provide a direct indication of the level of adjustment required of FET 12. to maintain the voltage across photo conductor 11 at its constant design value. This in turn will be indicative of the condition of the optics, etc. thereby indicating that the optics should be cleaned, the photo conductor replaced because of aging, etc. In all other respects, the circuit of FIG. 2 functions in precisely the same manner as the circuit arrangement described with relation to FIG. 1.

From the foregoing description, it will be appreciated that the present invention provides a new and improved amplifying and holding measurement circuit for use with a wide variety of measuring instruments and which is relatively simple in construction, low in cost and accurate in operation.

Having described several embodiments of a preferred manner of constructing a new and improved amplifying and holding measuring circuit in accordance with the invention, it is believed obvious that other modifications and variations of the invention are possible in light of the above teachings. It is, therefore, to be understood that the particular embodiments of the invention described are by way of example only and that the scope of the invention is to be determined as set forth in the attached claims.

What is claimed is:

1. An amplifying circuit including holding circuit means coupled to the output of a signal amplifier for the signal desired to be measured, said holding circuit means comprising a sampling capacitor and a holding capacitor, first switch means for intermittently coupling said sampling capacitor to the output of said signal amplifier and thereafter sequentially coupling said sampling capacitor across said holding capacitor, a field effect transistor operational amplifier having its input connected across said holding capacitor, a suitable indicating meter capable of providing a continuous visual indication of the value of a signal being measured connected across the output of said operational amplifier, said holding circuit means further including a second switching device and a discharge resistor intermittently connected in series circuit relationship through said second switching device across said sampling capacitor sequentially intermediate each operation of said first switching device, a properly poled coupling diode connected intermediate the output from the signal amplifier and the first switching device whereby the coupling diode blocks any discharge current from the sampling capacitor back into the output of the signal amplifier and causes it to discharge only through said discharge resistor intermediate each sampling interval, scale changing network means comprising a plurality of scale changing resistors and first selector switch means for selectively connecting a desired one of the plurality of scale changing resistors in circuit relationship across the output of said signal amplifier for the signals desired to be measured, a fixed value scaling resistor and a variable scaling resistor, and second selector switch means for selectively connecting either said fixed or said variable scaling resistor in circuit relationship with said plurality of scale changing resistors whereby the circuit may be operated selectively in a normal absolute reading mode with the fixed value scaling resistor connected in circuit relationship or may be operated in a comparative percent of previous measured signal mode with the variable value scaling resistor connected in circuit relationship.

* * * * *